United States Patent
Litofsky et al.

(10) Patent No.: US 7,634,562 B2
(45) Date of Patent: Dec. 15, 2009

(54) METHOD AND APPARATUS FOR DETERMINING APPLICATION RESPONSIVENESS OVER A NETWORK

(75) Inventors: Richard T. Litofsky, Rockville, MD (US); Jason Hunter, Saratoga, CA (US)

(73) Assignee: cyScape, Inc., Rockville, MD (US)

( * ) Notice: Subject to any disclaimer, the term of this patent is extended or adjusted under 35 U.S.C. 154(b) by 493 days.

(21) Appl. No.: 11/553,866

(22) Filed: Oct. 27, 2006

(65) Prior Publication Data

US 2008/0104224 A1    May 1, 2008

(51) Int. Cl.
*G06F 15/16* (2006.01)
(52) U.S. Cl. ................................. 709/224; 709/219
(58) Field of Classification Search ......... 709/200–203, 709/217–227

See application file for complete search history.

(56) References Cited

U.S. PATENT DOCUMENTS

| | | | |
|---|---|---|---|
| 6,944,660 B2 | | 9/2005 | Eshghi et al. |
| 7,246,101 B2* | | 7/2007 | Fu et al. .................... 706/46 |
| 7,454,433 B2* | | 11/2008 | Ebert .................... 707/102 |
| 7,487,508 B2* | | 2/2009 | Fu et al. .................... 719/310 |
| 2002/0083188 A1* | | 6/2002 | Hericy et al. ............... 709/235 |
| 2002/0112049 A1* | | 8/2002 | Elnozahy et al. ........... 709/224 |
| 2003/0233445 A1* | | 12/2003 | Levy et al. ................ 709/224 |
| 2005/0107985 A1* | | 5/2005 | Agrawal et al. ............. 702/186 |
| 2005/0154693 A1* | | 7/2005 | Ebert .................... 707/1 |
| 2007/0266145 A1* | | 11/2007 | Nesbitt et al. ............... 709/224 |

* cited by examiner

*Primary Examiner*—Moustafa M Meky
(74) *Attorney, Agent, or Firm*—Schwegman, Lundberg & Woessner, P.A.

(57) ABSTRACT

Application responsiveness over a network, such as for a web site or web-based application, is monitored and optionally recorded by tracking actual end users interacting with the application and the time it takes for their requested web pages to load. The process involves a web server that sends instrumented web pages or pointers to such instrumentation code in response to browser requests. This instrumentation causes scripting code on the client browser to gather data sufficient to enable determination of how long the page took to load, with separate measurements for latency time and/or intra-page load time, and to classify the type of request for which the measurements correspond. The scripting code can report the values to a record keeper or an external process. In one embodiment, Page Lifecycle Events are used to track and update a Marker and Timestamp from which the page load times and classifications are derived.

52 Claims, 4 Drawing Sheets

METHOD AND APPARATUS FOR DETERMINING APPLICATION RESPONSIVENESS OVER A NETWORK

BACKGROUND

Today's Internet users have high expectations for their online experiences. Users expect the web sites and web-based applications they use to work properly, to be highly responsive, and to load quickly in their browser. Despite this, slowly responding web pages are a common complaint among Internet users.

Users have short attention spans on web sites and a limited threshold for how long they will wait for a web page to respond to their actions, such as clicking on a link or a button, and for how long it takes a page to load in their browser. As a web page or web-application's responsiveness fails to perform as expected, users quickly become frustrated and will abandon a site in search of a faster performing alternative.

This abandonment costs businesses significant revenue due to lower online sales and conversion rates, damaged brand image, higher support costs, and lost customers. Further compounding the problem is that web sites continue to become more bandwidth-intensive, as more technologies and richer media are added to web pages to make sites more compelling and interactive.

Businesses often set goals for web page response time and strive to develop their web pages to load within a specific amount of time. Businesses have attempted to adopt various techniques to try and understand what page load times users are experiencing, and to identify areas that need improvement.

In one such attempt, automated "robots" in various locations on the Internet are used to simulate user activity. These robots make periodic web requests to the web site server, and monitor how long a page takes to be retrieved. While this approach is effective in determining whether a web site is up and operational, it does not provide an accurate view of the page load times that the actual web site users are experiencing on the site. This is because such robots do not account for the variables which impact web site responsiveness and page load times for the actual users of the site, such as the performance of each user's computer system that their browser runs on, and the actual quality and throughput of each user's Internet connection, which can vary widely from user to user.

In yet other attempts, a basic timing function is used in isolation on a page which tracks the amount of time that elapses from the point after a page starts loading, to the point at which it finishes.

Such attempts at monitoring page load times do not provide an adequate view of network responsiveness. They fail to measure the total duration that ensues between the time a user takes an action on one page, and the time the next page begins loading. Without this measurement, components of the network and overall system performance, which can have a significant impact on the web site's responsiveness and page load times, cannot be accounted for. Therefore one cannot accurately determine how long a page actually took to load from the user's viewpoint, which may be the viewpoint that matters most.

In still other attempts, the load time data is buffered on the client and not transmitted and recorded until a later time. Should a browser crash or network failure occur, it is possible the data may be never recorded and permanently lost. Such attempts may also require that a particular web page on a site be retrieved to initiate the tracking session before other pages on the site can be tracked, thereby possibly limiting the amount of pages from the user's session that can be monitored.

Data provided by such prior attempts may also be misinterpreted because it generally does not take into account the conditions under which the page was loaded, such as if the page was served from cache, which can greatly impact page load times and yield misleading measurements as a result.

DETAILED DESCRIPTION

In the following description, reference is made to the accompanying drawings that form a part hereof, and in which is shown by way of illustration specific embodiments which may be practiced. These embodiments are described in sufficient detail to enable those skilled in the art to practice the invention, and it is to be understood that other embodiments may be utilized and that structural, logical and electrical changes may be made without departing from the scope of the present invention. The following description of example embodiments is, therefore, not to be taken in a limited sense, and the scope of the present invention is defined by the appended claims.

The functions or algorithms described herein are implemented in software or a combination of software and human implemented procedures in one embodiment. The software may consist of computer executable instructions stored on computer readable media such as memory or other type of storage devices. The term "computer readable media" is also used to represent any means by which the computer readable instructions may be received by the computer, such as by different forms of wireless transmissions. Further, such functions correspond to modules, which are software, hardware, firmware or any combination thereof. Multiple functions are performed in one or more modules as desired, and the embodiments described are merely examples. The software is executed on a digital signal processor, ASIC, microprocessor, or other type of processor operating on a computer system, such as a personal computer, server or other computer system.

Figure 1:
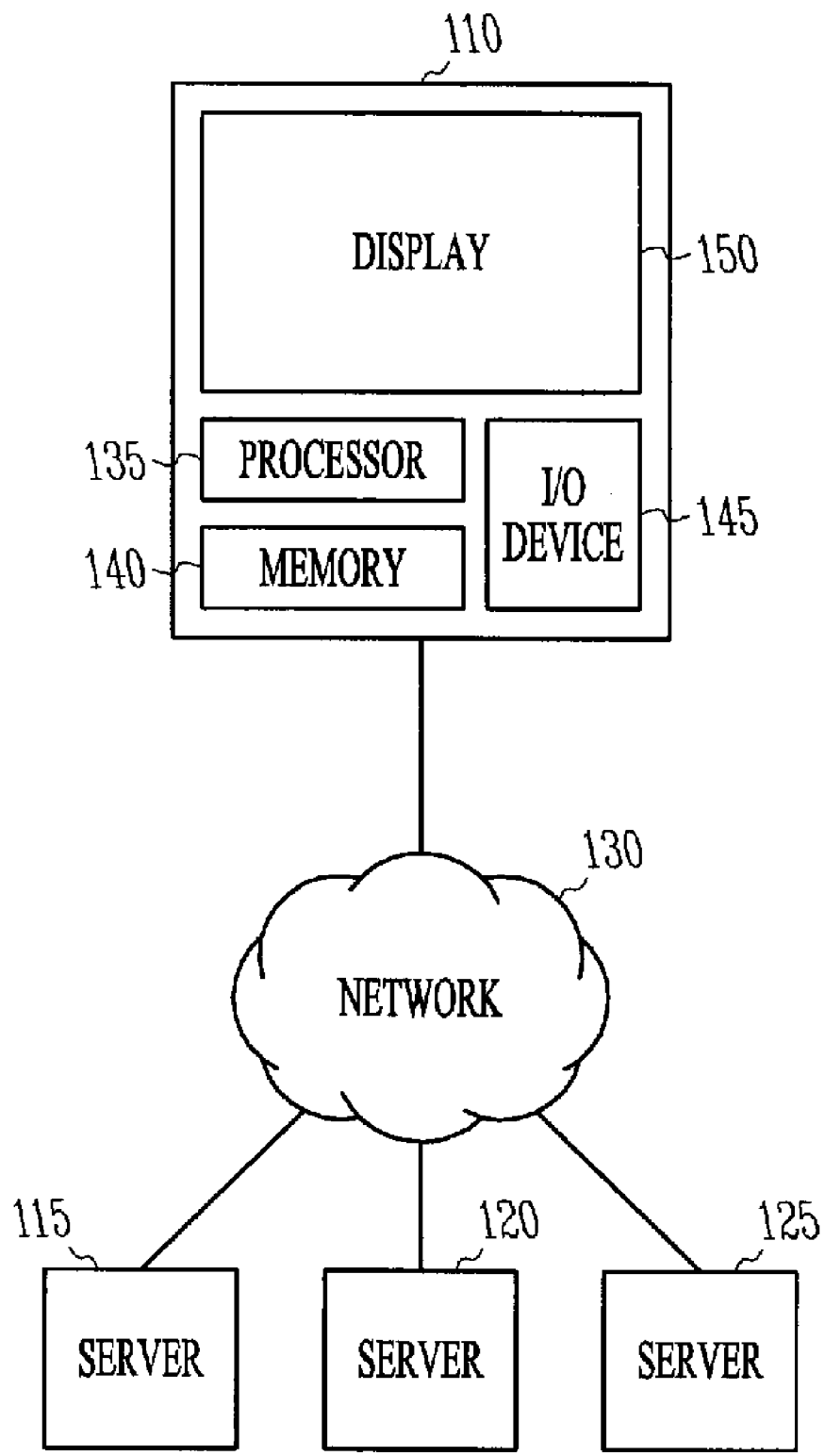
FIG. 1 is a block diagram of a client server environment coupled via a network according to an example embodiment.

In FIG. 1, a client computer 110 is shown connected to one or more web servers 115, 120 and 125 via a network 130, such as the Internet. The client computer includes a processor 135, memory 140 and I/O device 145, which may include a network interface card, either hardwired, wireless or both to provide connection to the network 130. A web browser or other such agent running in the processor 135 is used to interface with one or more web servers and render pages for display on a display 150 to a user as well as facilitate navigation between web pages. I/O device 145 is a mouse type navigation device or keyboard, allowing selection of links in web pages by clicking, typing, or other operation.

The servers may be similar in architecture to the clients. Servers contain one or more processors, memories, storage devices and network interface cards in various embodiments. Servers store the web pages and/or execute code that generates web pages that are sent to clients on request, and as described below, provide instrumentation in the form of script code or other code that causes browsers on the clients to track various page load times. In some embodiments, the instrumentation may be a pointer to such code, such as a script tag that causes the client computer to retrieve the code when rendering a web page. Such code may be stored on any desired networked server or storage available to the client computer. The instrumentation may be provided from a server, such as a server providing web analytics functions either as a stand alone function or part of a group of analytics functions. In some embodiments, one of the servers may be used to receive information from the client computer 110 regarding application responsiveness, as indicated by web page load times and hittype, or may receive data from which page load times and hittype can be determined.

Several embodiments dealing with application response time over a network in terms of interactions between a client or user and a server hosting a website, and providing data from such interactions, are described. In a first embodiment, one or more cookies or other construct(s) are used to retain a Timestamp and Marker in memory, which persist and are sharable across web page requests made from the same client during a user's web site visit. The Timestamp and Marker are used in tandem to enable the determination of various load times and classifications, including the duration from the time a user clicks on a link on a web page (or other action that results in a new web request) to the time the resultant page starts loading ("latency"), the duration from the time the resultant page starts loading and finishes loading ("intra-page load time"), the total duration from the time the user first requests a page to the time the page finishes loading (overall page load time, which may not always include a latency measurement in certain circumstances as explained later), and a category which classifies the type of request that these timings are for ("hittype"). The terms Page Load Time (PLT), "load times" and "page load times" are used interchangeably throughout this document to refer to page load time and measurements thereof. The term Timestamp is used throughout this document to refer to a temporal measurement which, when used with another temporal measurement, yields a given duration. Examples of Timestamps include a system date/time stamp, and the number of elapsed units of time from a given point of time, such as the number of seconds or milliseconds since Jan. 1, 1970. The term Marker is used throughout this document to refer to a value that is noted at one point in time for the purpose of later use. For example a Marker can be used to hold a given state value such as "exited" or "transitional", or it could hold an arbitrary value, such as a web address URL, or portion thereof, or even a representation thereof such as a hash or other such value that represents the data.

In one embodiment the Marker is managed in an interaction between the server and the client using the browser's onLoad, onBeforeUnload, and onUnload events, as well as others. Script code (such as JavaScript or VBScript) executed on the client side uses the Marker and Timestamp to calculate latency and intra-page load time, and for those requests where latency cannot be measured, determines for what reason it cannot and reflects this in the hittype. In a further embodiment, data that allows determination of latency or intra-page load time or hittype, or a combination thereof, is gathered by the client and sent to a server or external process.

In one embodiment, cached pages may load more quickly and therefore page load times for cached pages may be separately classified as such. To identify when page load time data is from a page that may have been served from cache, a Timestamp cookie is set on the client within each received page using the onBeforeUnload event. The server sends its view of the Timestamp cookie value to the client by hard-coding it within the page it serves. Then client-side JavaScript can compare the server's stated view of the cookie with the client's view to see if these Timestamps match. If they do not, the page can be determined as cached.

In yet a further embodiment, page load times or data from which load times can be determined are reported to a remote server, such as a record keeper that may log the data, or an external process that performs other such operations on or with the data, by issuing an image request with a query string. In some embodiments, the external process may serve as a relay or proxy that forwards the data to other systems such as a record keeper. The external process may display the data. Further, the external process may use the data to derive or transform the data, for example maintaining statistics. Still further, the external process may trigger alerts or cause another process to trigger alerts, based on the received data. The time values and other metadata are encoded in the query string. This allows optionally recording load times to servers other than the origin servers for more convenient storage and analysis.

In yet a further embodiment, page load times and the hittype are accessible and exposed to other code running to the client. The enables developers to program web pages to take special actions related to the results of the page load times and or determined hittype. For example, a web page can be programmed to take special actions based on the measured page load times and determined hittype. These actions, among others, may include displaying some or all page load time information and or its hittype in the web page, alerting the user when a page is being displayed from cache, loading alternate content, redirecting the browser, or if the page is determined to be cached, retrieving a fresh copy of the page.

In some embodiments web pages are instrumented using script code that is included in web pages at Lifecycle Event locations within each page to track and report page load times and the hittype of individual web pages within a site or group of sites. Such code may be statically hard coded into the page, dynamically inserted into the page by code executing on the server, or retrieved by the browser by including a script tag or similar construct in the page. In one embodiment the Lifecycle Event locations include: In a global script section of the web page that is executed by the browser as the page loads; in the browser's onLoad event handler for the page, called by the browser after the page and its components finish loading; in the browser's onBeforeUnload event handler for the page, called by the browser before it unloads the current page; in the browser's onUnload event handler for the page, called by the browser when a page unloads; and in the browser's onError event handler, called by the browser when a script error occurs on the page. Other or fewer events may be used in further embodiments, and it should be noted that the names of the Lifecycle Events or constructs used to trigger the described actions based on such events may change over time for browsers or other mechanisms used to receive information via a network.

One or more web pages within a web site or group of web sites can be instrumented with this code to track page load timing as desired by the site developers or operators. The set of pages that contain this instrumentation and has visibility to Timestamp and Marker storing constructs are considered to be within the PLT "family". Pages within a site that do not include this instrumentation, or pages on other sites, are generally referred to as "non-family" pages or "outside" the PLT family.

In one embodiment to track page timings, one or more cookies or other construct(s) are maintained during the user's visit to a site by the script code that resides in PLT family pages, with new values periodically overwriting old values. One cookie, called Timestamp, maintains a date/time value set to the current system date/time. Because the value can be set within the browser, this Timestamp can be based on the browser's system clock and therefore comparing Timestamp values can produce reliable time differentials. In one embodiment, the other cookie, called Marker, is set to reflect the various Lifecycle Events that occur in the browser which are significant to deriving page timings and interpreting its meaning by examination of the hittype. In another embodiment, a Marker is set to reflect the full or partial web page address of a visited web page or a value derived there from. In further embodiments, the other constructs for retaining values for Timestamps and Markers may include hidden form fields or encoding of values in the web page (URL) query string. The purpose of such constructs is to retain the values in memory so values are persisted and sharable across web page requests made from the same client during their web session. Examples of other constructs that could be used to facilitate retaining these values include Adobe Flash, JavaScript, VBScript, and encoding the information in the query string.

Cookies are generally viewable by pages from the same domain, so the pages that may be said to be in the same PLT family may include instrumented pages from the same domain in one embodiment that utilizes cookies, but could include other pages in embodiments that utilize different constructs for sharing the Timestamp and Marker information, thereby extending the pages or web sites that constitute the PLT family.

Thus various embodiments may provide an accurate method and apparatus for determining application responsiveness over a network. The systems and methods described herein may provide a holistic view of the web site's responsiveness and web page load times as experienced by each of the site's actual users. This may enable businesses to more accurately measure how their web page load times are performing in the "real world", and provide a higher level of granularity for reporting on and interpreting such data. Additionally, various embodiments may provide one or more benefits such as helping businesses identify and improve upon network, system, and/or web page design issues which impact the performance of their web site, and to help improve the web experience for the users of their site.

Lifecycle Events with State-Oriented Markers

Prior to providing example scenarios, a description is provided below of actions that may be performed on PLT family pages during each of the Lifecycle Events in various embodiments. This example demonstrates one embodiment that uses Marker values to reflect execution states. A later example demonstrates a further embodiment that uses arbitrary values in a Marker.

WITHIN THE GLOBAL SCRIPT BLOCK:
Note the current clock time of the web user's system, storing in a variable called $pagestart
Note the value of any Marker, storing in a variable called $initmarker
Set the Marker to the value "entering"
WITHIN THE ONLOAD PAGE EVENT HANDLER:
Note the current clock time of the web user's system, storing as $pageend
Note the Timestamp value, storing as $timecookie. Set to 0 if none.
Calculate the intra-page load time as $pageend-$pagestart
Calculate the latency as $pageend-$timecookie
Determine if the page is cached (see logic explained later)
Determine the hittype of the request (see logic explained later)
Record the intra-page load time, latency, and or hittype via image retrieval (see logic explained later). (The latency is not reported if the hittype is one for which latency is deemed unreliable or not available.)
Set the Marker value to "entered"
WITHIN THE ONBEFOREUNLOAD PAGE EVENT HANDLER:
Note the current clock time of the web user's system
Note the present value of the Timestamp, if any
Alter the Marker value to "transitional"
If the onBeforeUnload callback was called twice within a very short duration, set the Marker value to "doubled" (done by comparing the Timestamp cookie value to current clock time on the browser)
Set the Timestamp to match the current clock time of the web user's system
WITHIN THE ONUNLOAD PAGE EVENT HANDLER:
Set the Marker value to "exited"
WITHIN THE ONERROR PAGE EVENT HANDLER:
Set the Marker value to "errored"
Log the captured error and timing details via an image retrieval Cache Detection, Hittype Determination, Logging of Results Further details on cache detection, hittype determination, and logging of results are now provided. During server-side page processing, the server retrieves the Timestamp value sent by the client and writes the numerical value into the page or writes a non-timestamp value like "−1" if the value was not sent. The client-side onLoad page event handler compares the hard-coded server's value to the value seen on the client-side. If the Timestamp exists and its value as seen from the client-side perspective does not match the hard-coded value as seen from the server-side perspective, the page is determined to be cached. This information may be used to determine that any latency and page load time values resulting from this navigation were influenced by caching.

The hittype assigned may be any arbitrary value useful for categorizing or describing the conditions under which a web page was accessed or viewed by a client. The combination of several factors may determine the hittype. In some embodiments these factors include the server-side view of the Marker ($servermarker), the client-side view of the Marker as it exists at the start of the global script block ($initmarker), the client-side view of the Marker as it exists during the onLoad event handler ($clientmarker), the client-side view of the Timestamp ($timestamp), and the calculation of the cache detection as stated above. In some embodiments the first match below determines the hittype. Note that in some embodiments many page timings will have a hittype of "Click" with both latency and intra-page load time being measured and reported. In one embodiment the following logic is applied to determine the hittype, the latency, and or the intra-page load time:
$servermarker is null, $initmarker is null, $clientmarker is not null
The hittype is "Entry", indicating this is the first PLT family page request for the visitor in the current session.

Latency is not reported because no start time for the page request is available. Intra-page load time and Entry hittype is reported.

$clientmarker is null

The hittype is "Cookieless", indicating the user does not have cookies available.

Latency is not reported because PLT Marker data and unload times from the previous page are not available. Intra-page load time and Cookieless hittype is reported.

Cache detection logic indicates the page was cached

The hittype is "Cached", indicating the page was served from cache.

Latency is not reported because latency is not applicable to cached pages. Intra-page load time and Cached hittype is reported.

$servermarker is "transitional" and $initmarker is "exited"

The hittype is "Click", indicating the user has moved from one PLT family page to another and timings and PLT data is fully tracked.

Latency is recorded, as well as the intra-page load time and Click hittype.

$servermarker is "exited" and $initmarker is "exited"

The hittype is "ComeBack", indicating the user left the PLT family during the session but has returned to a PLT family page.

Latency is not reported because there is no accurate Timestamp available indicating when the user left the non-family page. Intra-page load time and ComeBack hittype is reported.

None of the above conditions matches:

The hittype is IntraOnly, indicating that latency is not available for reasons other than the above.

Latency is not reported. Intra-page load time and Intra-Only hittype is reported.

In various embodiments, additional or fewer states may be included. Some pages may use alternate state names to differentiate their actions for different time calculation or hittype determination and classification.

Logging values related to PLT may be done in various ways. In one embodiment, the logging is done at a server or computer that is different from the web page server that is being monitored. The logging may be done by constructing in client-side script a dynamically created Image object. The image object's "src" property is set to point to a remote server. Also included in the "src" property is a query string with the name/value data to send. Setting of this property triggers the browser to make a request to the reporting server, also referred to as a Recordkeeper, for an image. The remote server retrieves the name/value pairs from this request and logs this information. The remote server returns an image, such as a small transparent image, to satisfy the browser's request. This method of communicating information may be used to communicate many different types of information in various embodiments, and is not limited to the context of website or application responsiveness over a network.

Example Interaction

Figure 2:
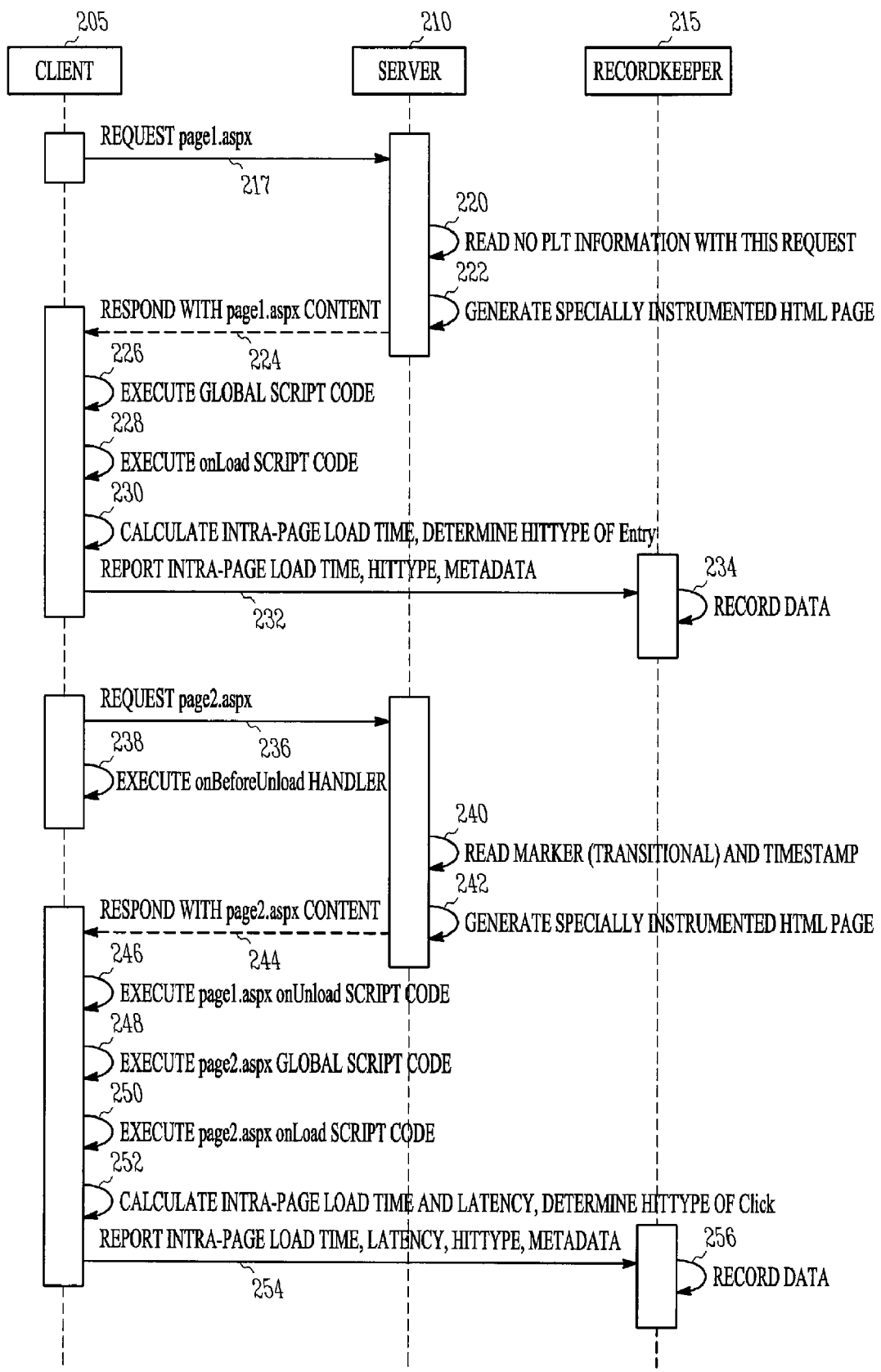
FIGS. 2, 3, and 4 are timing diagrams illustrating operations that occur on various networked components to track network, application, and browser responsiveness according to an example embodiment.
Figure 3:
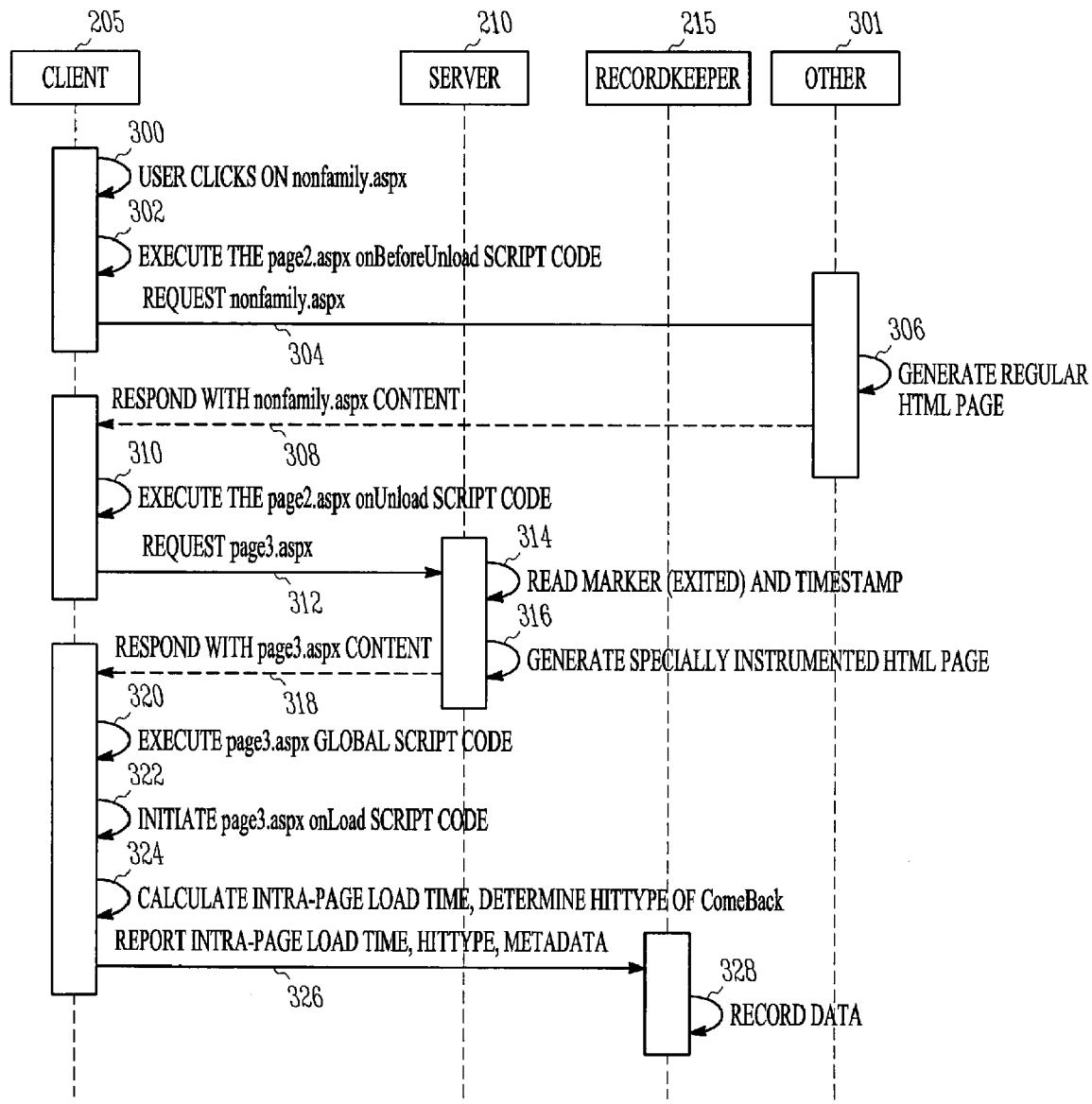
Figure 4:
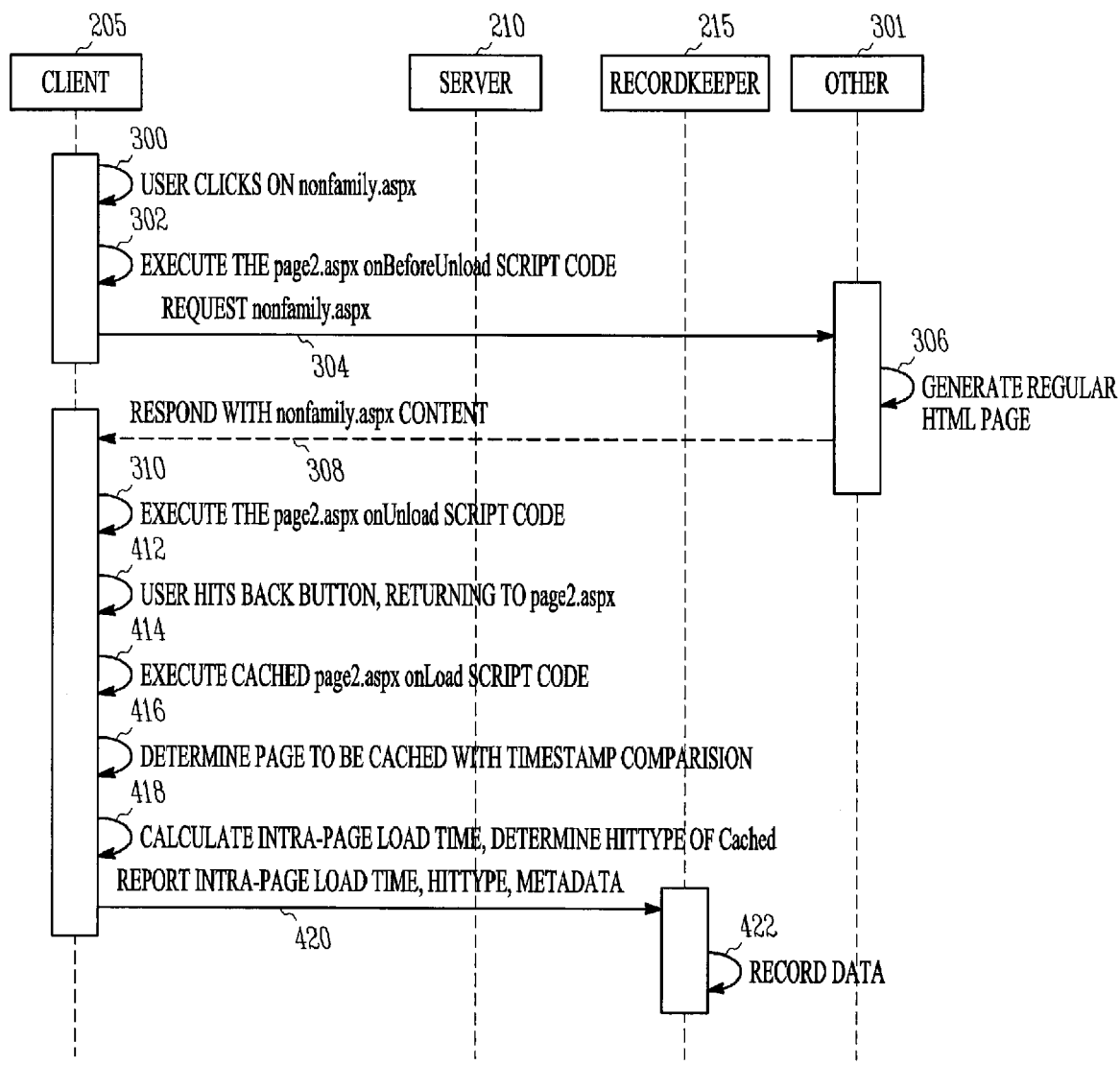

Examples of client/server interaction utilizing the application responsiveness monitoring mechanisms are now described for various embodiments tracking web page requests as illustrated in FIGS. 2, 3, and 4. The terms "request" and "respond or response" relate to browser client side processing and server side processing respectively. These examples assume the page requests occur sequentially from one example to the next, except where noted. A client 205, server 210 and Recordkeeper 215 are shown in the top of FIG. 2, with actions that each performs illustrated in columns below them. At 217, the client requests a page within the PLT family, page1.aspx from the server 210. In this example, that is the first time that the client, through a browser, connects to the server. The address for this example is http://server.com/page1.aspx. No special Timestamp or Marker is sent to the server 210 at this time since it is the first page visit within the PLT family. The server 210 thus does not see PLT related information, such as the Timestamp or Marker, at 220. At 222 the server generates special page load time tracking script code that is dynamically inserted directly into the web page, or this special script code may have been statically hard coded in the web page previously in another embodiment. This script code is then returned by the web server at 224 to the client browser at 205. This script executes on the client browser at 226, 228 and 230 to calculate the intra-page load time as the difference between the time the page started to load at 226 and the time its onLoad event fires at 228, which occurs once the page has finished loading. In one embodiment, a pointer to script code such as a script tag is returned in the page at 222 instead, and the actual script code is first retrieved by the client from a specified location at 226 and then executed with the rest of the previously mentioned steps then executed. A pointer to the script code may also be used as appropriate in the following example interactions.

Script determines the hittype as "Entry" at 230 because there were no PLT cookies with Timestamp and Marker data sent with the request to the server, but the Marker cookie was successfully set on the client-side during this page processing and is accessible. Had it not been, the hittype would have been "Cookieless" in one embodiment. Script reports the intra-page load time, the hittype of "Entry", and possibly other details such as a user or session ID, via an image load request at 232 to the Recordkeeper 215. Further methods for reporting the load time and hittype may also be used, such as using script to initiate a background request to a server such as can be performed with a XMLHttpRequest and other Asynchronous JavaScript and XML (AJAX) based technologies. Recordkeeper 215 records the data at 234. In one embodiment, Recordkeeper 215 is a different server, but may be same as server 210 in further embodiments.

A request for a second web page, page2.aspx, within the same PLT family of web pages is then issued by client 205 at 236. In one embodiment, a link to the second page was contained on the first page, and a user clicked on the link from page1.aspx. The onBeforeUnload event of page1.aspx is executed at 238 on the client 205 to set the Timestamp and Marker cookies, which are read at the server at 240. The client sends to the server the following two cookies, a Timestamp cookie with the timestamp noted during onBeforeUnload and a Marker cookie noting the state as "transitional".

At 242 the server 210 generates special page load time monitoring script code or pointer, and other information as previously described, that is dynamically inserted directly into the page2.aspx web page, or this special script code may have been statically hard coded in the web page previously. This script code is then returned by the web server at 244 to the client 205. When the client receives the response from the server, and before the new page is loaded, the page1.aspx onUnload fires at 246, and overrides the Marker cookie to "exited".

The client then calculates the intra-page load time using the Timestamp taken at 248 and the actions of 250 and 252 as it did while loading the page1.aspx page. However, at 252, unlike at 230, the client determines the hittype to be "Click" because the server sees the Marker cookie as "transitional"

while the client sees it as "exited". In other words, the PLT processing can affirmatively conclude that the previous page was a member of the PLT family. This combination means that a latency measurement is available and meaningful. Script calculates the latency as the difference between the Timestamp cookie value (set at 238) and the current system time on the browser ($pagestart) as obtained in the global script section of code running on page2.asp at 248. Script reports the intra-page load time, the latency time, and the Click hittype at 254 with metadata to the Recordkeeper 215 for recording at 256.

Further examples are now described as shown on FIGS. 3 and 4. In one embodiment, the user navigates or is transferred to a page outside of the PLT family, referred to as nonfamily.aspx. This can be a page within the same web site or some other site as represented at other server 301. The request is made at 300. The onBeforeUnload event of page2.aspx fires at 302, setting the Timestamp to the present time on the client and Marker to "transitional". The user request is issued by the browser at 304. The other server 301 generates a normal uninstrumented page at 306 and returns it at 308. Next the onUnload event of page2.aspx fires at 310, setting the Marker to "exited". The retrieved page is a non-PLT family page which does not support PLT detection and does not contain any special code or event handlers of the invention.

The user may then navigate away from the nonfamily.aspx page to page3.aspx at 312, which is another PLT family page. The request includes a Timestamp that was set by the previous onBeforeUnload called at 302, which may potentially be quite old. The request also includes a Marker, set by the previous onUnload, with a value of "exited" as seen by the server at 314. At 316 the server generates special page load time monitoring script code that is dynamically inserted directly into the web page, or this special script code may have been statically hard coded in the web page previously. This script code is then returned by the web server at 318 to the client 205. Script in the global script at 320 executes as page3.aspx loads, and the onLoad event at 322 then calculates the intra-page time as previously described and determines at 324 the hittype to be ComeBack because the server sees the Marker as "exited", as does the client. This means that an accurate latency measurement cannot be obtained because there is no current Timestamp available that indicates when the client initiated the request to leave the nonfamily.aspx page. Script at 326 reports the intra-page load time and hittype of ComeBack to the Recordkeeper 215 for recording at 328.

A further example is now described as shown on FIG. 4 as an alternative action to that shown in the preceding example. As in FIG. 3, the user navigates or is transferred to a page outside of the PLT family, referred to as nonfamily.aspx. This can be a page within the same web site or some other site as represented at other server 301. The request is made at 300. The onBeforeUnload event of page2.aspx fires at 302, setting the Timestamp to the present time on the client and Marker to "transitional". The user request is issued by the browser at 304. The other server 301 generates a normal uninstrumented page at 306 and returns it at 308. The browser then executes the onUnload event of page2.aspx at 310. At this point, after receiving the nonfamily.aspx content at 308, instead of the user navigating to page3.aspx, the user clicked the back button at 412, returning to page2.aspx, which for the purposes of this scenario can be assumed to be cached in the browser. No request is made to the server. Rather, the previously retrieved HTML is displayed and the contained instrumentation script is re-executed at 414. Script at 416 compares the client's view of the Timestamp value with the server's view as was included previously in the page when it was originally received. Since these values differ, the page is determined at 416 to be cached. Script at 418 calculates the intra-page load time and the hittype to be Cached. Script at 420 reports the intra-page load time and hittype of Cached to the Recordkeeper 215 for recording at 422.

In a further example, not diagrammed, the user refreshes page2.aspx using a reload operation such as hitting the refresh button. To clarify this scenario, it's important to note that when a user navigates from Page A to Page B, changes to cookie values made during Page A's onBeforeUnload are seen by the server during the request for Page B (if it's within the cookie's visibility parameters such as its domain and path). Changes to cookie values made during Page A's onUnload are generally not seen on the Page B request. One exception is when it's a Refresh request under the Internet Explorer browser. If the user refreshes page2.aspx under Mozilla Firefox, a request is made to the server, sending a cookie(s) that contains a Timestamp and a Marker value of "transitional", because onUnload effects are not visible. Script determines the hittype to be Click because the server sees the Marker cookie as "transitional" and the client sees it as "exited". Script reports the intra-page load time, latency time, and the hittype Click to the Recordkeeper. If the user refreshes page2.aspx under Microsoft Internet Explorer, a request is made to the server, sending a cookie(s) that contains a Timestamp and a Marker value of "exited", because onUnload effects are visible. Script determines the hittype to be ComeBack because the server sees the Marker cookie as "exited". This is a case where the latency is valid but ultimately discarded because this is not distinguished from a true ComeBack scenario as seen above. Script reports the intra page load time and the ComeBack hittype to the Recordkeeper. This behavior may change in future versions of browsers without significant impact.

In yet a further example, not diagramed, after first retrieving page2.aspx in the example stated earlier, the user then opens a new browser window or new browser tab, requesting page2.aspx within the new tab/window. A request is made to the server, but the onBeforeUnload and onUnload events of the original page2.aspx have not fired. The request includes a Marker cookie value of "entered" set during the previous page2.aspx onLoad. In response, script determines the hittype to be IntraOnly because the server sees the state as "entered". Script reports the intra-page load time and the hittype IntraOnly to the Recordkeeper.

In an embodiment that uses cookies as the construct to hold the Timestamp and Marker values, if the client does not support cookies, or if the user has disabled cookies, and requests a PLT family page without the use of cookies, the request is made to the server as above. Page load time measuring script is dynamically inserted into the web page content returned by the web server, or the script may already be statically included in the page. Script calculates the intra-page time as it does above. Script determines the hittype to be Cookieless because the client sees no state exists in the Marker cookie at all where one should be present. Script reports the intra-page load time and the hittype Cookieless to the Recordkeeper.

Some web applications refresh pieces of a web page rather than an entire page, whether such pieces are dynamically loaded or refreshed. The above algorithms may be adapted to track load times for such pieces of a web page by instrumenting the corresponding pieces of the page.

In a further embodiment, web pages may be instrumented to track latency and or multiple intra-page load times and or hittypes for the various portions of a web page which comprise the overall web page. For example, if a page has an Adobe Flash component, a menu component and a text area, the site's developers or operators may want to instrument PLT for each of these sections and report on their intra-page load times separately so it can be determined which portion(s) of the page took what duration to load. In still a further embodiment, instrumentation may be used to track load times and or hittypes for a portion or multiple portions of the page, as such portions may be subsequently dynamically loaded or refreshed independently from the overall page.

Unexpected or a typical scenarios can occur when trying to calculate load times, which may be handled in different ways. If JavaScript is disabled in the client browser, no client-side script actions take place, and no PLT values are recorded. If a JavaScript error occurs, the onError Lifecycle Event handler will be called in some embodiments. It sets the Marker cookie to errored, resulting in a hittype of IntraOnly. If a Lifecycle Event or multiple events are not called as expected, in almost all circumstances this creates a hittype of IntraOnly. If a Lifecycle Event is called more than once, it normally does not matter. In a situation where it does, when onBeforeUnload is called multiple times within a very short duration, the multiple calls are detected and the Marker is set to doubled. This produces a hittype of IntraOnly, because the calculated latency time cannot be trusted. If multiple concurrent requests are made to the same PLT family of pages, the intra-page load time calculations will be correct, but latency values may be miscalculated because the various pages will compete to set the Marker and Timestamp cookies. They almost always produce a hittype of IntraOnly because the client and server state views are perceived as abnormal and therefore the latency will be treated as non-applicable.

Lifecycle Events with Arbitrary Markers

Some web sites use static pages which are hard coded or partially hard coded and do not provide flexibility to easily incorporate dynamically generated page script code into web pages for execution by the client. Despite this, web site developers or operators may still wish to instrument their pages so that page load times can be monitored and tracked on static pages, and so that static pages are included in the PLT family. To meet this need, script code or a pointer to script code can be hard coded into static pages so these pages are included in the PLT family and their page load times can be recorded and their hittype values determined.

In some embodiments an arbitrary value, such as a URL, portion of the URL, or hashed representation or other such derivative of a URL is used as the Marker value (rather than state values as discussed earlier). In one particular embodiment each web page, in its onBeforeUnload or onUnload event handling code, sets the Marker value to the current page's URL location (as well as the Timestamp as explained earlier). This Marker URL value can then be compared in a later PLT family page's onLoad event against the later page's "Referer" header to determine if the two values match (ignoring fragment identifiers and other inconsequential parts of the URL). If the two values match, it can be determined the request was made directly by a PLT family page. This indicates the latency is trustworthy and the hittype is Click. If the URL values both exist but do not match, it indicates there was a non-family page visit in between the requests, thus the latency is not trustworthy and the hittype is ComeBack. In one embodiment where a cookie construct is used to hold the Marker, and no Marker cookie is present, yet a cookie set in the global script block can be seen, the hittype is Entry, but if the global script block cookie cannot be seen, the hittype is Cookieless.

Note the Marker need not hold a single value. It may be useful to store in the Marker both a state and a URL value. This allows multiple ways of determining intra-page load time and either the hittype or latency or both and enables a larger PLT family of pages.

Note on the Abstract

The Abstract is provided to comply with 37 C.F.R. § 1.72 (b) to allow the reader to quickly ascertain the nature and gist of the technical disclosure. The Abstract is submitted with the understanding that it will not be used to interpret or limit the scope or meaning of the claims.

What is claimed is:

1. A method of monitoring application responsiveness over a network, the method comprising:
   instrumenting a web page that causes a client receiving the web page to gather data sufficient to enable determination of a hittype or a latency or both the hittype and the latency;
   wherein the latency is a duration from a time a user clicks on a link on a web page, or other action that results in a new web request, to the time the resultant page or content starts loading; and
   wherein the hittype is an arbitrary value for categorizing or describing conditions under which a web page was accessed or viewed by a client.

2. The method of claim 1 and further comprising instrumenting the web page to gather data sufficient to enable determination of an intra-page load time.

3. The method of claim 1 and further comprising sending the instrumented page to the client.

4. The method of claim 1 wherein the instrumented page includes code that causes the client to determine the hittype or the latency or both the hittype and the latency.

5. The method of claim 4, wherein the instrumented page includes code that causes the client to perform an action based on one or more of the hittype, the latency or an intra-page load time.

6. The method of claim 5, wherein the action includes one or more of displaying page load time information, displaying the hittype, generating an alert, loading alternate content, or redirecting the browser.

7. The method of claim 1 wherein the gathered data enables a server or external process to determine the web page's hittype or latency or both the hittype and the latency.

8. The method of claim 1 wherein the instrumented page includes code that causes the client to send the data to a record keeper or external process.

9. The method of claim 8 wherein the client sends the data to the record keeper or external process by use of Asynchronous JavaScript and XML (AJAX).

10. The method of claim 8 wherein the hittype or the latency or both the hittype and the latency are calculated by the client and transmitted via a web request.

11. The method of claim 8 wherein the client sends the data to the record keeper or external process by use of an image request query string.

12. The method of claim 11 wherein the data is encoded in the query string.

13. The method of claim 1 wherein the instrumented page includes code at Lifecycle Event locations within the page.

14. The method of claim 13 wherein the Lifecycle Event locations are selected from the group consisting of a global script section of the web page executed by a client browser as the page loads, the browser's onLoad event handler for the page called by the browser after the page finishes loading, the browser's onBeforeUnload event handler for the page called by the browser as it is about to unload the current page, the browser's onUnload event handler for the page called by the browser when the page unloads, and the browser's onError event handler called by the browser when a script error occurs.

15. The method of claim 1 wherein the instrumented page uses one or more cookies that hold a Timestamp value and Marker that holds a predefined state value.

16. The method of claim 1 wherein the instrumented page provides a Timestamp value from the web server which is compared to a Timestamp value from the client to determine if the page or portion of the page was served from cache.

17. The method of claim 16, wherein the instrumented page includes code that causes the client to take an action based on the determination that the page or portion of the page was served from cache.

18. The method of claim 17, wherein the action includes one or more of retrieving a fresh copy of the page, loading alternate content, redirecting the browser or generating an alert.

19. The method of claim 1 wherein the instrumented page uses one or more constructs that enable a Timestamp value and Marker that holds a predefined state value to be shared across web page requests.

20. The method of claim 1 wherein the instrumented page uses one or more cookies that hold a Timestamp value and Marker that holds a web site URL, or partial URL, or hash or other such representation of the URL thereof, or other arbitrary value.

21. The method of claim 1 wherein the instrumented page uses one or more constructs that enable a Timestamp value and Marker that holds a web site URL, or partial URL, or hash or other representation of the URL, or other arbitrary value to be shared across web page requests.

22. The method of claim 1, wherein the gathered data pertains to one or more portions of the page.

23. The method of claim 22, wherein the gathered data pertains to one or more portions of the page which are dynamically loaded or refreshed one or more times subsequent to the initial loading of the page.

24. A web page server comprising:
  means for delivering an instrumented page, wherein the instrumentation causes a client to gather data sufficient to enable determination of a hittype or a latency or both the hittype and the latency; and
  means for sending the instrumented page to the client in response to a request for the page;
  wherein the latency is a duration from a time a user clicks on a link on a web page, or other action that results in a new web request, to the time the resultant page or content starts loading; and
  wherein the hittype is an arbitrary value for categorizing or describing conditions under which a web page was accessed or viewed by a client.

25. The web page server of claim 24 wherein the instrumented page causes a client to gather data sufficient to determine an intra-page load time.

26. The web page server of claim 24 wherein the instrumented page includes code that causes the client to determine the hittype or the latency or both the hittype and the latency.

27. The web page server of claim 24 wherein the instrumented page includes code that causes the client to send data sufficient to enable determination of the hittype or the latency or both the hittype and the latency, to a record keeper or external process.

28. The web page server of claim 27 wherein the client sends the data to the record keeper or external process by using a query string of an image request.

29. The web page server of claim 28 wherein the data or the hittype or the latency or both the hittype and the latency, are encoded in the query string.

30. The web page server of claim 27 wherein the hittype or the latency or both the hittype and the latency are transmitted via a web request.

31. The web page server of claim 27 wherein the client sends the data to the record keeper or external process by use of Asynchronous JavaScript and XML (AJAX).

32. The web page server of claim 27 wherein the instrumented page includes code at Lifecycle Event locations within the page.

33. The web page server of claim 32 wherein the Lifecycle Event locations are selected from the group consisting of a global script section of the web page that is executed by a client browser as the page loads, the browser's onLoad event handler for the page called by the browser after the page finishes loading, the browser's onBeforeUnload event handler for the page called by the browser as it is about to unload the current page, the browser's onUnload event handler for the page called by the browser when the page unloads, and the browser's onError event handler called by the browser when a script error occurs.

34. The web page server of claim 24 wherein the instrumented page uses one or more cookies that hold a Timestamp value and Marker that holds a predefined state value.

35. The web page server of claim 24 wherein the instrumented page provides a Timestamp value from the server which is compared to a Timestamp value from the client to determine if the page or portion of the page was served from the client's cache.

36. The web page server of claim 24 wherein the instrumented page uses one or more constructs that enable a Timestamp value and Marker that holds a predefined state value to be persisted and shared across web page requests.

37. The web page server of claim 24 wherein the instrumented page uses one or more cookies that hold a Timestamp value and Marker that holds a web site URL, or partial URL, or hash or other representation of the URL, or other arbitrary value.

38. The web page server of claim 24 wherein the instrumented page uses one or more constructs that enable a Timestamp value and Marker that holds a web site URL or partial URL, or hash or other such representation of the URL, or other arbitrary value to be shared across web page requests.

39. The web page server of claim 24, wherein the gathered data pertains to one or more portions of the page.

40. The web page server of claim 39, wherein the gathered data pertains to one or more portions of the page which are dynamically loaded or refreshed one or more times subsequent to the initial loading of the page.

41. A computer readable medium containing instrumentation for causing a client computer to perform a method, the method comprising:
  gathering data sufficient to enable determination of a hittype or a latency or both the hittype and the latency; and
  sending the data or the hittype or the latency or both the hittype and the latency to a record keeper or external process;

wherein the latency is a duration from a time a user clicks on a link on a web page, or other action that results in a new web request, to the time the resultant page or content starts loading; and wherein the hittype is an arbitrary value for categorizing or describing conditions under which a web page was accessed or viewed by a client.

42. The computer readable medium of claim 41, wherein the method further includes gathering data sufficient to enable determination of an intra-page load time.

43. The computer readable medium of claim 41 wherein the instrumentation comprises a pointer to code for execution on the client computer.

44. The computer readable medium of claim 43 wherein the pointer comprises a script tag for insertion into web pages.

45. The computer readable medium of claim 41 wherein the instrumentation comprises code for execution on the client computer.

46. The computer readable medium of claim 41 wherein sending to the record keeper or external process involves using an image request with values encoded in a query string.

47. The computer readable medium of claim 41 wherein sending to the record keeper or external process involves using Asynchronous JavaScript and XML (AJAX).

48. The computer readable medium of claim 41 wherein the instrumented page contains one or more constructs that hold a Timestamp value and a Marker used to determine the hittype or latency or both the hittype and the latency.

49. The computer readable medium of claim 48 wherein the instrumented page provides a Timestamp value from the web server which is compared to a Timestamp value from the client to determine if the page or portion of the page was served from cache.

50. A system comprising:
   a computer readable medium containing instrumentation;
   means for sending the instrumentation for insertion into a family of web pages that cause a client computer receiving such web pages to perform a method, the method comprising:
      gathering data sufficient to enable determination of a hittype or a latency or both the hittype and the latency; and
   sending the data or the hittype or the latency or both the hittype and the latency to a record keeper or external process;
   wherein the latency is a duration from a time a user clicks on a link on a web page, or other action that results in a new web request, to the time the resultant page or content starts loading; and
   wherein the hittype is an arbitrary value for categorizing or describing conditions under which a web page was accessed or viewed by a client.

51. The system of claim 50, wherein the data further enables determination of an intra-page load time.

52. The system of claim 50 wherein the means for sending the instrumentation includes a pointer for insertion into web pages, wherein the pointer points to code that may be retrieved by the client computer and executed to perform the method.

* * * * *

UNITED STATES PATENT AND TRADEMARK OFFICE
CERTIFICATE OF CORRECTION

PATENT NO. : 7,634,562 B2  Page 1 of 1
APPLICATION NO. : 11/553866
DATED : December 15, 2009
INVENTOR(S) : Litofsky et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 542 days.

Signed and Sealed this

Twenty-first Day of December, 2010

David J. Kappos
*Director of the United States Patent and Trademark Office*